US008692870B2

(12) United States Patent
Akeley et al.

(10) Patent No.: US 8,692,870 B2
(45) Date of Patent: Apr. 8, 2014

(54) ADAPTIVE ADJUSTMENT OF DEPTH CUES IN A STEREO TELEPRESENCE SYSTEM

(75) Inventors: Kurt Barton Akeley, Novato, CA (US); Jaron Zepel Lanier, Sausalito, CA (US); Johnny Chung Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 12/824,257

(22) Filed: Jun. 28, 2010

(65) Prior Publication Data

US 2011/0316984 A1  Dec. 29, 2011

(51) Int. Cl.
*H04N 13/04* (2006.01)

(52) U.S. Cl.
USPC .............................. 348/51; 348/42; 348/739

(58) Field of Classification Search
USPC ........................................................... 348/51
See application file for complete search history.

(56) References Cited

U.S. PATENT DOCUMENTS

| | | | |
|---|---|---|---|
| 5,726,704 A * | 3/1998 | Uomori | 348/47 |
| 6,157,733 A | 12/2000 | Swain | |
| 6,570,566 B1 * | 5/2003 | Yoshigahara | 345/427 |
| 6,710,797 B1 * | 3/2004 | McNelley et al. | 348/14.16 |
| 7,027,659 B1 | 4/2006 | Thomas | |
| 7,136,090 B1 | 11/2006 | McDuffie White | |
| 7,209,160 B2 | 4/2007 | McNelley et al. | |
| 7,428,001 B2 | 9/2008 | Schowengerdt et al. | |
| 2004/0027451 A1 | 2/2004 | Baker | |
| 2004/0233275 A1 * | 11/2004 | Tomita | 348/51 |
| 2005/0237382 A1 | 10/2005 | White | |
| 2007/0097206 A1 | 5/2007 | Houvener et al. | |
| 2010/0060722 A1 * | 3/2010 | Bell | 348/51 |

OTHER PUBLICATIONS

Hopf, "An Autostereoscopic Display Providing Comfortable Viewing Conditions and a High Degree of Telepresence", IEEE Transactions on Circuits and Systems for Video Technology, vol. 10, No. 3, Apr. 2000.*

McNelley, Steve., "Immersive Group Telepresence and the Perception of Eye Contact", Retrieved at << http:// www.dvetelepresence.com/files/eyeGazeStudy.pdf >>, 2005, pp. 7.

Schreer, et al., "VIRTUE—The Step Towards Immersive Tele-Presence in Virtual Video Conference Systems", Retrieved at <<http://ip.hhi.de/imedia_G3/assets/pdfs/eBusiness00.pdf >>, Proceedings eWorks, Sep. 2000, pp. 7.

Xu, et al., "True-View Videoconferencing System through 3-D Impression of Telepresence", Retrieved at << http:// www.edc.uoc.gr/~panas/MAster%20Athens%20Projects%201/1.%20VC%20educational%20applications/True-view%20videoconferencing%20system%20through%203-D.pdf >>, BT Technology Journal, vol. 17, No. 1, Jan. 1999, pp. 59-68.

(Continued)

*Primary Examiner* — Jayanti K Patel
*Assistant Examiner* — Jessica Prince
(74) *Attorney, Agent, or Firm* — Holly Nguyen; Carole Boelitz; Micky Minhas

(57) ABSTRACT

Described is a stereoscopic display (telepresence) system that includes a depth cue adjustment mechanism for changing screen disparity to move a fixation distance of a viewer (subject) closer to a focus distance, thereby providing more desirable viewing conditions. In one aspect, the depth cue adjustment mechanism adjusts a depth cue by moving the fixation distance forward, and/or by moving the focus distance backward. Also described is detecting encroachment, where the object is perceived as being too close to the subject viewer for comfort, and adjusting one or more depth cues (e.g., object scale) to counteract the sensation of the encroachment.

18 Claims, 4 Drawing Sheets

(56) References Cited

OTHER PUBLICATIONS

Fisher, Scott S., "Virtual Environments, Personal Simulation & Telepresence", Retrieved at << http://itofisher.com/sfisher/portfolio/files/images/7/VirtualSimPresence-pdfrev.pdf >>, In Ars Electronica: Facing the Future, 1999, pp. 7.

* cited by examiner

FIG. 2
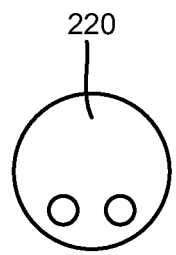
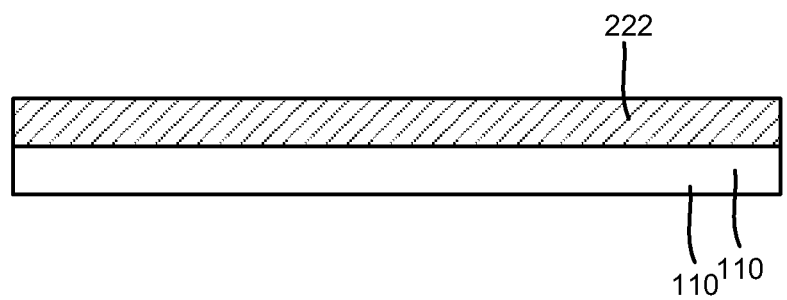
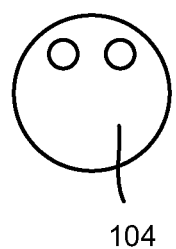
FIG. 2

ADAPTIVE ADJUSTMENT OF DEPTH CUES IN A STEREO TELEPRESENCE SYSTEM

BACKGROUND

A stereo telepresence system uses cameras to capture stereo images of one set of (one or more) remote participants, which are then displayed on 3D display devices of another set of (one or more) remote participants, and vice-versa. The general idea is to make the other participants look as if they are physically present on the opposite side of a room, e.g., as if the display device was a transparent window.

Existing stereo telepresence systems do not provide a particularly comfortable or realistic experience. A general problem is that when the geometric projections are correct, the focus depth cue is incorrect, in that the viewer (the subject) focuses at the depth of the screen (where the light is being emitted), rather than at the perceived depths of the object or objects being viewed.

While this simplifies the engineering of the display, it contributes to two viewing problems. For one, display surface are often closer to the subject than the (apparent) distances to the objects. Viewers are known to experience physical discomfort when they focus their eyes to a distance that differs significantly from their fixation distance, that is, the distance from the viewer to the intersection of their lines of sight/the point at which the eyes converge. Because the subject generally fixates on an object, and objects are typically located beyond the "transparent window," the focus distance is typically significantly smaller than the fixation distance, which tends to result in physical discomfort.

Further, subjects in telepresence situations are known to be sensitive to encroachment, which refers to the sense that an object (generally another person) has moved too close for comfortable interaction. Because subjects estimate the distance to an object by (sub-consciously) weighing available cues to depth, the too-close focus distance biases their estimation downward, which can result in an unwarranted sense of encroachment.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a stereoscopic display system includes a depth cue adjustment mechanism that adjusts one or more depth cues to optimize viewer comfort. In one implementation, the stereoscopic display is part of a telepresence system by which the subject views an object (e.g., another person). In one aspect, the depth cue adjustment mechanism adjusts the fixation-distance depth cue by changing the screen disparity of the object, such as by shifting left and right stereoscopic images (e.g., corresponding to a sequence of frames) relative to one another as perceived by the subject to move the fixation distance closer to the focus distance.

In one aspect, the depth cue adjustment mechanism adjusts one or more depth cues when likely encroachment is detected, to counteract a sensation of encroachment. To this end, likely encroachment may be sensed/detected by processing video of the subject to determine the subject's reactions, e.g., body movements and/or facial expressions that indicate likely encroachment. When detected, the depth cue adjustment mechanism may change the screen disparity to move the fixation distance farther back (e.g., by shifting the left and right stereoscopic images farther apart relative to one another), and/or change one or more other depth cues, e.g., by scaling the object smaller to make the object appear farther away as perceived by the subject. In conjunction with scaling, for example, the depth cue adjustment mechanism may then shift the images closer to one another again to reduce the fixation distance.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2 is a representation of how a subject and object appear to one another in respective telepresence systems.

DETAILED DESCRIPTION

Figure 1:
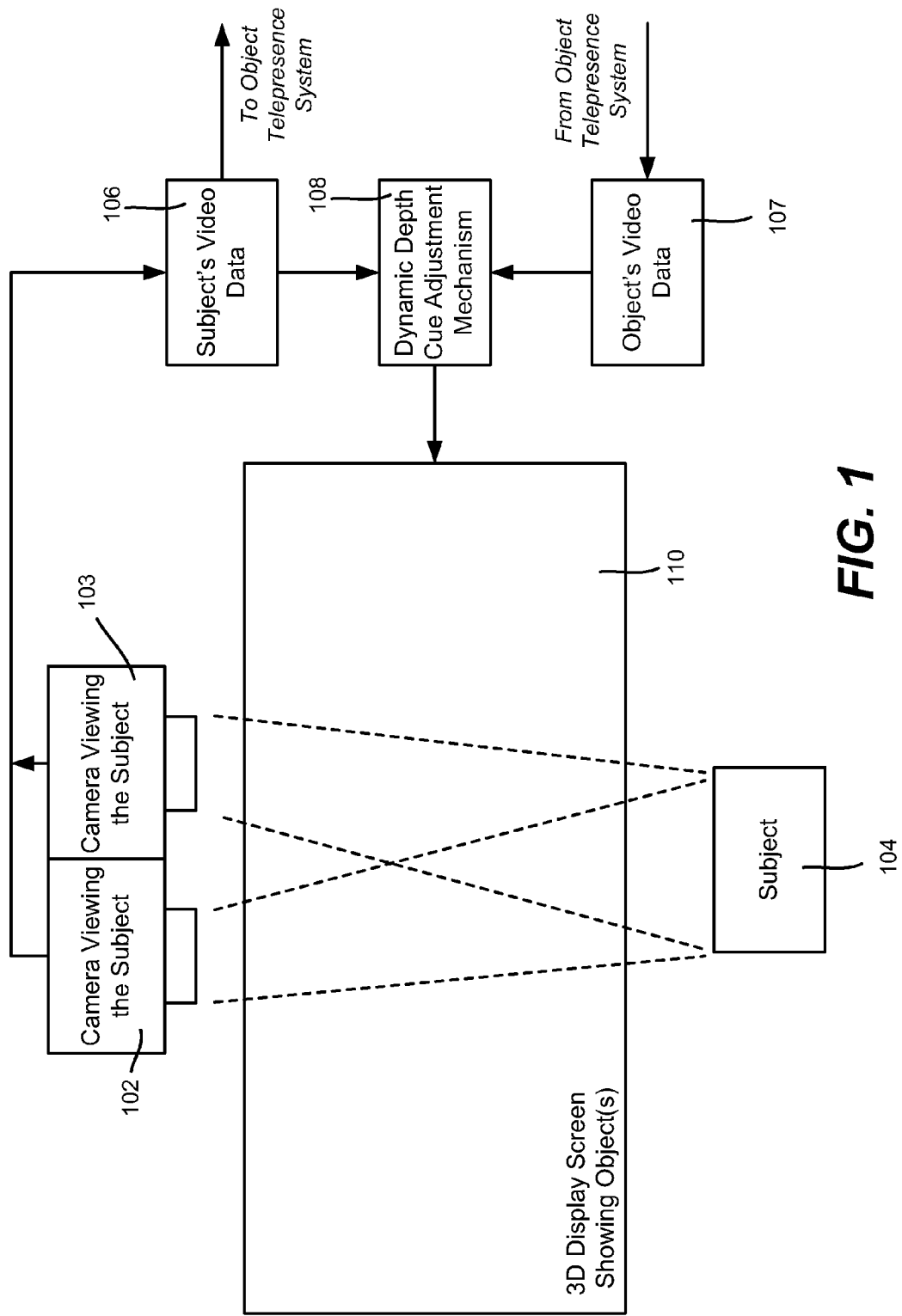
FIG. 1 is a block diagram representing a subject's telepresence system for viewing stereoscopic video images of an object with adjusted screen disparity.

In general, viewers (subjects) estimate the distance to an object as a weighted sum of various cues to depth, which may be divided into four groups, based on how they utilize parallax: Non-parallax cues inform the human brain through the instantaneous collection of light passing through a single point in space, and include cues based upon occlusion, size, perspective, texture gradient, shading and aerial perspective (atmospheric effects on shading). Motion-parallax cues inform through changes (over time) in the light collected through a single point in space, and include object-motion parallax (object is moving), subject-motion parallax (the collection point moves in synchrony with changes in the subject's position), camera-motion parallax (the collection point moves independent of subject position, which is meaningful only when viewing a display screen). Binocular-parallax cues inform through the instantaneous collection of light passing through two distinct points in space, and include fixation distance and retinal disparity. Integral-parallax cues inform through the instantaneous integration of light passing through a small region (not a point) in space, and include accommodation (focus distance) and retinal blur.

The human perception system estimates distance by considering these available cues, each weighted by an estimate of its validity. In this manner, the cues contribute to the overall estimate of depth, though some more than others. During viewing of a screen intended to depict reality, some depth cues remain valid, but others indicate the distance to the screen instead of the distance to the depicted object. Non-parallax cues remain valid as long as the scene is rendered correctly and the viewer is in the correct (fixed) position relative to the screen. Motion-parallax cues remain valid in the same circumstances as the non-parallax cues, except that subject-motion parallax requires that viewer position be tracked and the scene rendered for the correct (dynamic)

position. For a display that exposes two separate images, one visible to the left eye and the other to the right, if these images are each computed correctly for the position of the corresponding eye then the binocular-parallax cues are valid. With respect to integral-parallax cues, the accommodation cue indicates the distance to the screen in commercially viable display systems; blur rendered into the image (or stereo images) can stimulate valid retinal-blur cues, but only in the (typical) case of accommodation to the screen distance (rather than to the object distance).

The technology described herein dynamically adjusts screen disparity corresponding to one or more of the depth cues that can be controlled to optimize the comfort of the viewing subject. This optimization involves tradeoffs, because discomfort can result both from too-close overall depth perception (e.g., encroachment) and from too-far fixation (e.g., accommodation-vergence conflict). Because objects are typically depicted as beyond the screen distance in telepresence systems, fixation distance is typically greater than accommodation distance. If this difference is too large viewer, discomfort results; (and if even larger, the viewer is unable to see a stereo image, instead seeing two independent images). To avoid discomfort and diplopia the technology reduces the fixation distance by modifying the left-eye and right-eye images, e.g., by displacing the images on the display or using other approaches (such as warping).

However with the fixation distance and accommodation distance both specifying a smaller-than-correct distance to the object, the subject may experience encroachment, which is the sense that the object being spoken with is too close for comfort. As described herein, one solution is to increase the fixation distance, while another, which does not increase the vergence-accommodation conflict, is to modify one or more other depth cues (such as object size) to indicate a greater distance. Viewer comfort may be estimated by tracking subject behavior (e.g., leaning forward or backward), subject expression (e.g., facial expression suggesting discomfort), and direct subject input (e.g., turning a knob to indicate intolerance of accommodation-vergence conflict).

As will be understood, various aspects of the technology described herein are thus generally directed towards a stereo-telepresence system that adaptively adjusts screen disparity such that objects appear to the subject to be situated at a comfortable distance, with their apparent locations remaining constant as the subject moves relative to the display (subject-motion parallax). When an object moves, this change in object position is accurately depicted for the subject (object-motion parallax). To give these effects, the display adjusts the screen disparity such that one or more depth cues to the object's position to differ from their actual cues, including the above-mentioned subject-motion parallax and object-motion parallax, and possibly others, e.g., object scale, focus depth, and/or depth of field blur.

While adjusting the screen disparity, the subject's fixation distance is able to remain comfortably close to their focus distance, yet the subject's sense of object encroachment may be avoided. To this end, the subject may be monitored for sensitivity to encroachment, such as gestures made by the body, facial expressions and so forth. When detected, the depth cues may be dynamically altered to reduce the encroachment sensation.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video technology in general.

FIG. 1 represents a stereo telepresence system from a subject's perspective; it can be readily appreciated that a participant corresponding to an object may have the same (or a similar) symmetric telepresence system. In general, stereo cameras 102 and 103 capture video images of the subject 104 to provide the subject's video data 106 to the object's telepresence system. As described herein, the dynamic depth cue adjustment mechanism 108 processes (on at least one processor) the object's received video data 107 to alter the screen disparity, whereby the subject's display 112 presents more desirable video. In addition, the subject's video data 106 may be fed to the dynamic depth cue adjustment mechanism 108, for use in encroachment detection.

With respect to detecting encroachment, because the subject's images are also being captured, the mechanism 108 (or associated other component) can detect when encroachment appears to be occurring. Various reactions of the subject 104, such as body movements and/or facial expressions detected by a machine learning-trained machine vision classifier or the like, may be used in a feedback loop to trigger an encroachment signal. Note that various levels of encroachment may be detected, which may correspond to different actions to reduce the sensation, as described below. For example, a subject suddenly backing his head away from the camera may be considered a stronger level of likely encroachment than a particular facial expression. Further note that the object video can be processed to "sense" encroachment (e.g., a sudden lurch forward) instead of or in addition to processing the subject's video data 106.

FIG. 2 represents a top view of the subject 104 and a single object 220 in their apparent respective locations, that is, the locations that each appears to the other. The intended effect is that subject 104 and object 220 appear to be facing each other, looking through a window the size of their respective display screens 110 and 222. Their physical locations are arbitrary, although they generally need to be physically positioned relative to their own screen as depicted. In other words, the object appears to the subject to be directly opposite the subject's display screen, although they may be located arbitrarily in the specified locations relative to their respective display screens.

Figure 3:
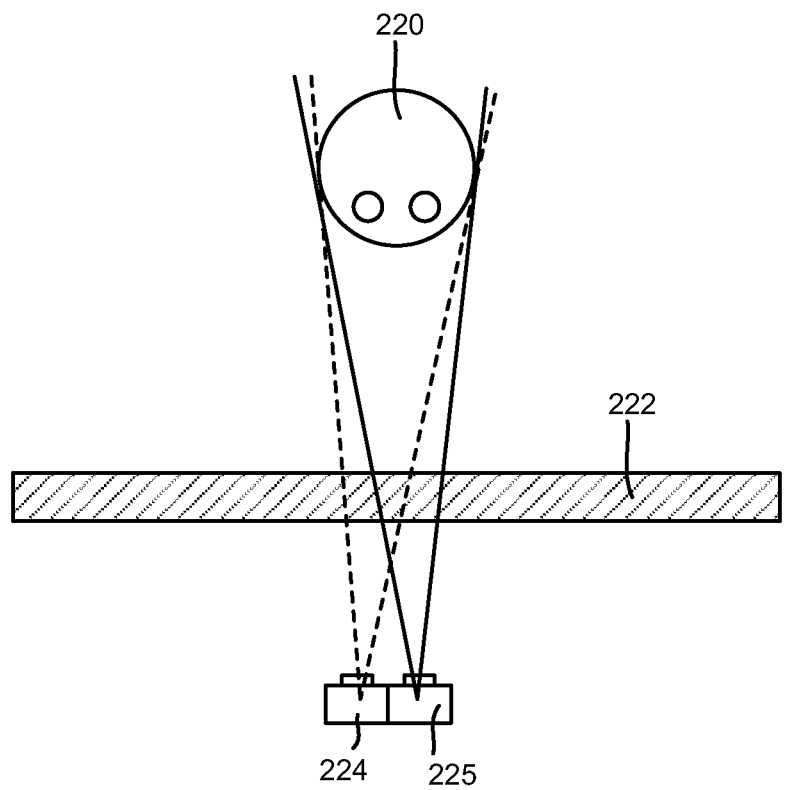
FIG. 3 is a representation of how in one implementation an object's stereo cameras align with the object to provide stereoscopic views to provide depth.

FIG. 3 depicts a top view of the object 220 in its physical environment, including the object's display screen 222 and two cameras 224 and 225 that capture images of the object 220. The cameras 224 and 225 are generally positioned to match the locations of the subject's eyes, in the coordinate space of the object 220; that is, as though the subject 104 and subject's screen were opposite the object and object screen, as depicted in FIG. 2. Note that the object's display screen must not occlude the object's camera views, however various known solutions to this problem exist.

As a result of the camera positions, images of the object are captured from the subject's apparent eye positions. When the subject 104 moves the camera positions are changed accordingly, so the object's cameras 224 and 225 capture images that match what the subject 104 would see in the arrangement of FIG. 2. Another implementation is to position many cameras and to merge image data from them to simulate intermediate positions.

One operation of the dynamic depth cue adjustment mechanism 108 is directed towards mapping the camera images of the object 220 onto the subject's display screen 110 (and vice-versa; for purposes of simplicity, the following describes the subject display screen 110 showing images from the object cameras 224 and 225). In one implementation, the cameras 224 and 225 are never rotated, that is, their image planes remain parallel to the object's display screen 222, and the cameras 224 and 225 are not tilted about their own optical axes. Further, the display is stereoscopic such that that the left-camera (left-eye) image on the subject's display screen 110 is visible only to the subject's left eye, and the right-eye image is visible only to the subject's right eye.

Note that keeping the cameras parallel to the screen is only one possible implementation, and other implementations are feasible. For example, if the cameras are rotated, the resulting image warps can be rectified by software.

Figure 4:
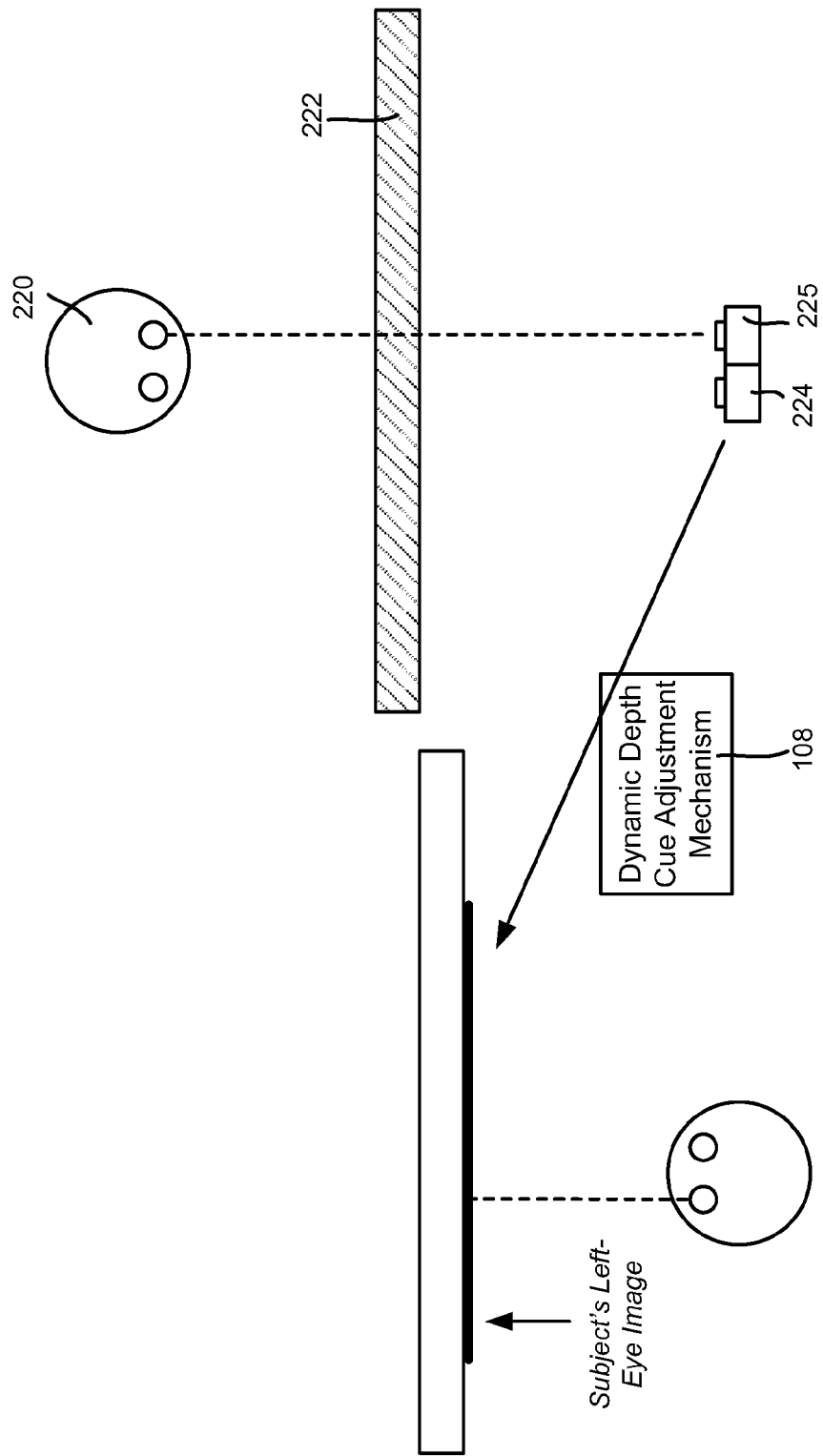
FIG. 4 is a representation of how in one implementation an object's stereo cameras are mapped to the display of the subject.

As generally represented in the example implementation of FIG. 4, the image taken by the left-eye object camera 225 is correctly mapped to the subject's display screen by reflecting the image both horizontally and vertically about its center, by scaling the image by the ratio of the subject's distance to the subject's screen and the camera's focal distance, and by generally positioning it such that the image's center is at the screen intersection of a line that extends perpendicular to the screen through the subject's left eye. The right-eye image is mapped using the same techniques, relative to the subject's right eye.

To reduce subject fixation distance, while minimally affecting other cues to depth, the dynamic depth cue adjustment mechanism 108 adjusts the screen disparity, such as by changing the mapping to shift the left and right images relative to one another, such that the object's left-eye image is positioned slightly to the right of the subject's left eye, and the object's right-eye image is positioned slightly to the left of the subject's right eye. Increasing these shifts eventually brings the left-eye and right-eye images of the object into alignment on the subject's display screen, whereby the subject fixation distance (when looking at the object) is equal to the distance to the screen, which is also equal to the subject's focus distance. Further reduction in fixation distance is possible but is generally not desirable. Note that warping the images is another way to change screen disparity.

In practice, changing the screen disparity is a compromise, in that moving the fixation distance nearer to the screen/focal distance results in less physical discomfort; however reducing the subject's perception of distance to the object potentially causes the sensation of encroachment. If encroachment is suspected, either based on the geometry of the viewing situation (e.g., the object really is moving closer to the subject) or on the behavior of the subject (e.g., the subject is leaning backward, or has an expression of annoyance and so forth), then the cues to depth can be adjusted to increase the apparent distance to the object.

One possible adjustment is to move the fixation distance further back. However this risks causing physical discomfort to the subject, particularly if done often and/or for a long time. Another possible adjustment is to reduce the scaling of the images, causing the object to appear smaller and therefore more distant. Such a rescaling may be done gradually so as to not to be detected by the subject. The techniques may be combined, e.g., one potential strategy to adjusting for encroachment is to more quickly increase fixation distance, then slowly rescale while reducing fixation distance. Note that the image mapping becomes more complex when rescaling.

Other depth cues may be changed, including retinal disparity, which in general corresponds to warping the images to vary the sense of depth. Focus depth, and/or depth of field blur are among the many visual cues that the human brain weighs and processes when estimating an object's depth.

By way of example, machine vision technology can accurately track three positions of a person, namely that of both pupils and the overall head position, which may be used to estimate the distance at which person is attempting to focus at a given moment. Other indications of focus, such as the optical properties of the lens in each eye, may be used. Focus is a dynamic adaptive process, and if the system does not want the person to focus on the physical distance of the screen, but instead on the virtual distance of what is displayed, such as remote individuals in a telepresence session, then the system may interfere with the cognitive feedback process at the moment when a person is about to settle on focusing on the screen's distance.

To this end, the images may be slightly blurred (e.g., using common software/GPU algorithms) just as the eyes seem to be converging on the distance of the physical screen. In that way, the feedback loop of the mental focusing process does not see (and thus focus on) sharper features at the distance of the physical screen, and instead continues searching for other cues in order to choose a focal distance. By suppressing such a cue, one or more other cues are emphasized to provide a better chance of being influential.

In general, blurring can be made to subside only at the system-chosen vergence distance, which creates an artificial dynamic focal plane out of a conventional screen. Note that the screen does not look as sharp as possible if a viewer is able to focus on the screen's actual distance, but the effect is acceptable (if kept within limits). In this manner, dynamic sensing of vergence along with changing the sharpness to be as sharp as possible at the system-desired focus distance is likely to lead to improved usability in specific applications like telepresence.

To summarize, changing the screen disparity and/or adjusting one or more cues to depth are performed such that the subject's fixation distance remains comfortably close to their focus distance. If the subject senses object encroachment (e.g., by up-to-date information on the subject, including position, movement, and facial expression), one or more cues to depth may be dynamically adjusted to reduce the encroachment sensation.

While the above adjustment techniques of decreasing the disparity between the fixation distance and focus distance reduces the chances of discomfort, depth cue adjustments may be used for other purposes. For example, adjusting depth cues may be used to direct the viewer's attention toward an object, such as in a storytelling or entertainment setting. Alternatively, exaggerating the disparity may be used to enhance the sensation of encroachment, if desired. For example, an entertainment video may seek to produce the encroachment sensation in viewers.

Further, in another aspect, slightly varying the synchronization of stereo screen disparity with focus depth over time, rather than remaining static, may potentially be used to reduce fatigue.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising a stereoscopic display on which a subject views an object, the display coupled to a mechanism that adjusts stereo screen disparity to reduce the disparity between a fixation distance of the subject and a focus distance of the subject;

wherein the mechanism adjusts one or more depth cues when likely encroachment is detected to counteract a sensation of encroachment by:

shifting left and right stereoscopic images relative to one another as perceived by the subject to move the fixation distance farther from the focus distance at a relatively fast rate; and scaling the object smaller to make the object appear farther away as perceived by the subject at a relatively slow rate.

2. The system of claim 1 wherein the stereoscopic display is part of a telepresence system.

3. The system of claim 1 wherein the mechanism adjusts the stereo screen disparity by shifting left and right stereoscopic images relative to one another as perceived by the subject to move the fixation distance closer to the focus distance.

4. The system of claim 1 wherein the mechanism adjusts the stereo screen disparity by sensing focus and dynamically providing sharp images at a focus distance that is close to the fixation distance.

5. The system of claim 1 wherein the likely encroachment is detected based on processing video of the subject to determine the likely encroachment from one or more reactions of the subject.

6. The system of claim 1 wherein when likely encroachment is detected, the mechanism adjusts one or more depth cues to make the object appear farther away as perceived by the subject.

7. The system of claim 1 wherein the mechanism further adjusts the one or more depth cues when likely encroachment is detected by shifting the left and right stereoscopic images relative to one another to move the fixation distance back closer to the focus distance.

8. The system of claim 1 wherein the mechanism adjusts the screen disparity at one or more various times in an attempt to reduce fatigue.

9. The system of claim 1 wherein the one or more depth cues comprise fixation distance, scale, retinal disparity, stereo screen disparity, focus depth, or depth of field blur, or any combination of fixation distance, scale, retinal disparity, stereo screen disparity, focus depth, or depth of field blur.

10. A method performed on at least one processor, comprising adjusting screen disparity to move a fixation distance of a stereoscopic image comprising left and right images closer to a focus distance, sensing for likely encroachment, and if detected, altering one or more depth cues to counteract the encroachment by:

shifting the left and right images relative to one another as perceived by a subject to move the fixation distance farther from the focus distance at a relatively fast rate; and scaling an object of the stereoscopic image smaller at a relatively slow rate to make the object appear farther away as perceived by the subject.

11. The method of claim 10 wherein the stereoscopic image comprises frames received by a subject component corresponding to an object in a telepresence system, and further comprising, sending video signals of a subject to a display corresponding to the object.

12. The method of claim 10 wherein the one or more depth cues are further altered to counteract the encroachment by shifting the left and right images relative to one another to move the fixation distance back closer to the focus distance.

13. The method of claim 10 wherein adjusting the screen disparity comprises blurring to move the focus distance.

14. The method of claim 10 further comprising, adjusting at least one depth cue over time in an attempt to reduce fatigue.

15. The method of claim 10 wherein sensing for likely encroachment comprises processing video of a subject viewing the stereoscopic image to detect for one or more reactions indicative of sensed encroachment.

16. A system comprising, a telepresence system that receives left and right stereo images of an object over a plurality of frames, the telepresence system adjusting screen disparity to reduce a difference between a fixation distance of stereoscopic video corresponding to a sequence of the left and right stereo images closer to a focus distance, and dynamically adjusting one or more depth cues to counteract encroachment by:

shifting the left and right images of the object relative to one another as perceived by a viewer to move the fixation distance farther from the focus distance at a relatively fast rate;

scaling the object smaller to make the object appear farther away as perceived by the subject at a relatively slow rate; and shifting the left and right stereoscopic images relative to one another to move the fixation distance back closer to the focus distance.

17. The system of claim 16 wherein adjusting the screen disparity comprises moving the fixation distance forward.

18. The system of claim 16 wherein adjusting the screen disparity comprises moving the focus distance backward.

* * * * *